May 28, 1935.  R. P. DIVNEY  2,002,852
THIRD AXLE UNIT FOR TRUCKS
Filed April 21, 1934   5 Sheets-Sheet 1

Inventor
RAYMOND P. DIVNEY.
By Robb & Robb
Attorneys

May 28, 1935.  R. P. DIVNEY  2,002,852
THIRD AXLE UNIT FOR TRUCKS
Filed April 21, 1934   5 Sheets-Sheet 3

Inventor
RAYMOND P. DIVNEY.
By
Attorneys

May 28, 1935.  R. P. DIVNEY  2,002,852
THIRD AXLE UNIT FOR TRUCKS
Filed April 21, 1934   5 Sheets-Sheet 4

Inventor
RAYMOND P. DIVNEY.
By Robert Cobb
Attorneys

Patented May 28, 1935

2,002,852

UNITED STATES PATENT OFFICE 2,002,852

THIRD AXLE UNIT FOR TRUCKS

Raymond P. Divney, Galion, Ohio, assignor to The Perfection Steel Body Company, Galion, Ohio, a corporation Application April 21, 1934, Serial No. 721,825

9 Claims. (Cl. 280—124)

The present invention appertains to automotive vehicles and embodies primarily improvements in what are known to those versed in this art as third axle units designed for application to trucks, and ordinarily built so that they may be embodied in automotive truck constructions as sold by the manufacturer. In other words, automotive trucks today are usually made and sold embodying a four wheel design including two front steering wheels, a rear drive axle and two rear driving wheels on the rear driving axle.

The third axle unit of the type of this invention is intended to enable an increase in the load carrying capacity of the standard four wheel truck, being adapted for application to the chassis of such a truck without material modification of the said chassis whatsoever. Again, this third axle type unit is designed to increase the loading space of four wheel trucks to enable the handling of bulky merchandise, under which conditions an extension frame is applied to the chassis or frame of the standard truck and the third axle of the unit is mounted upon this extension frame and acts as an idling rear axle.

Under certain conditions, if the extension frame be of a certain considerable length as applied to the standard chassis, it is possible to utilize the third axle unit of this invention by emplacing the same along with the rear axle of a standard truck wholly upon the extension frame, in which event, of course, the rear axle of the standard truck is located rearwardly of its ordinary mounting in relation to the chassis of said truck, and an extension driving shaft is employed to carry the drive from the regular main driving shaft of the truck to the replaced or relocated rear axle mounted on the extension frame The primary objects of the present invention are to provide a very flexible design of mountings for the springs intermediate said springs and the axles, to provide novel radius rods for the aligning of the third axle and for maintaining said axle definitely in proper relation to the trunnion shaft connections between the main or extra heavy springs and the frame or chassis of the truck with certain novel parts associated with the radius rods to absorb the brake torque and road shock incident to the road use of the vehicle. The details of the radius rod mountings and connections will appear more fully hereinafter, the same including spring or yielding shock absorbing parts for dissipating the braking forces in a manner later to appear herein.

The invention further involves novel radius rod constructions intermediate the frame or chassis of the vehicle and the spring hangers for the rearmost or third axle, which is the idling axle.

According to the present invention, the springs of the vehicle are flexibly attached to the front hanger below the truck rear or driving axle and this arragement ensures that said axle will move through practically its original path or arc as the unit passes over uneven surfaces. The radius rod means of the invention affords adjustment advantages to ensure the operation of the driving axle in substantially the exact or original arc of its mounting when originally carried by the main truck chassis, this feature being of primary importance having in mind that the said result must be achieved since the original brake equipment is used and it is absolutely necessary owing to the sensitiveness of such brake equipment that the movement of the rear driving axle shall be identically the same when said axle is mounted upon the extension frame of the third axle unit, as when the axle was previously disposed upon the truck frame itself.

According to this invention the mountings between the springs and the rear driving and idling axles and wheels is extremely flexible and such as to permit of free upward and downward movements of the ends of each axle and the wheels thereon independently with relation to the corresponding movements of the other axle. Additional to the foregoing, the hanger mountings between the springs and the driving and idling axles at the rear of the truck, or upon the extension chassis, as the case may be, are such as to permit of lateral floating of the load relatively to the axles and supporting wheels without any substantial lateral distortion of the main springs on which the said axles are hung, all with a view of maintaining the load substantially horizontal under ordinary driving conditions and when passing over ordinary inequalities in the road level.

With the foregoing objects primarily in view, the present invention embodies certain detail constructions of parts, which will be pointed out later herein, and which are shown fully in the accompanying drawings, in which:

Figure 3 is a top plan view of the parts shown in Figure 2, and in addition thereto, one of the brake drums is illustrated.

Figure 12 is a cross sectional view taken about on the line 12—12 of Figure 11;—and, Figure 13 is a rear perspective view of a truck vehicle equipped with the third axle unit means of the invention, the relative movements of the two rear axles, one the driving axle and the other the idling axle, and the wheels carried thereby, being depicted, the left wheels of the idling axle being elevated whilst the right wheels thereof are down, and the right wheels of the driving axle being elevated whilst the left wheels are down.

Figure 2:
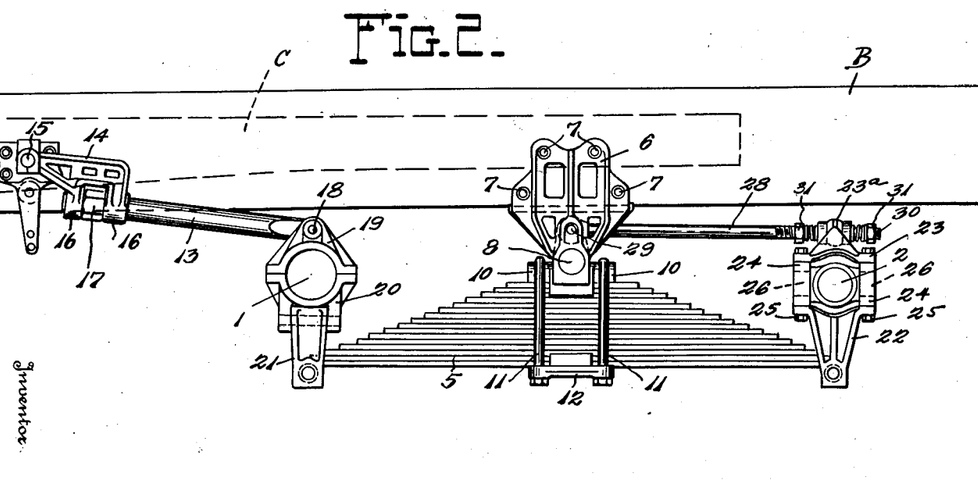
Figure 2 is a side elevation showing primarily the parts illustrated in Figure 1, the wheels of the vehicle omitted.
Figure 13:
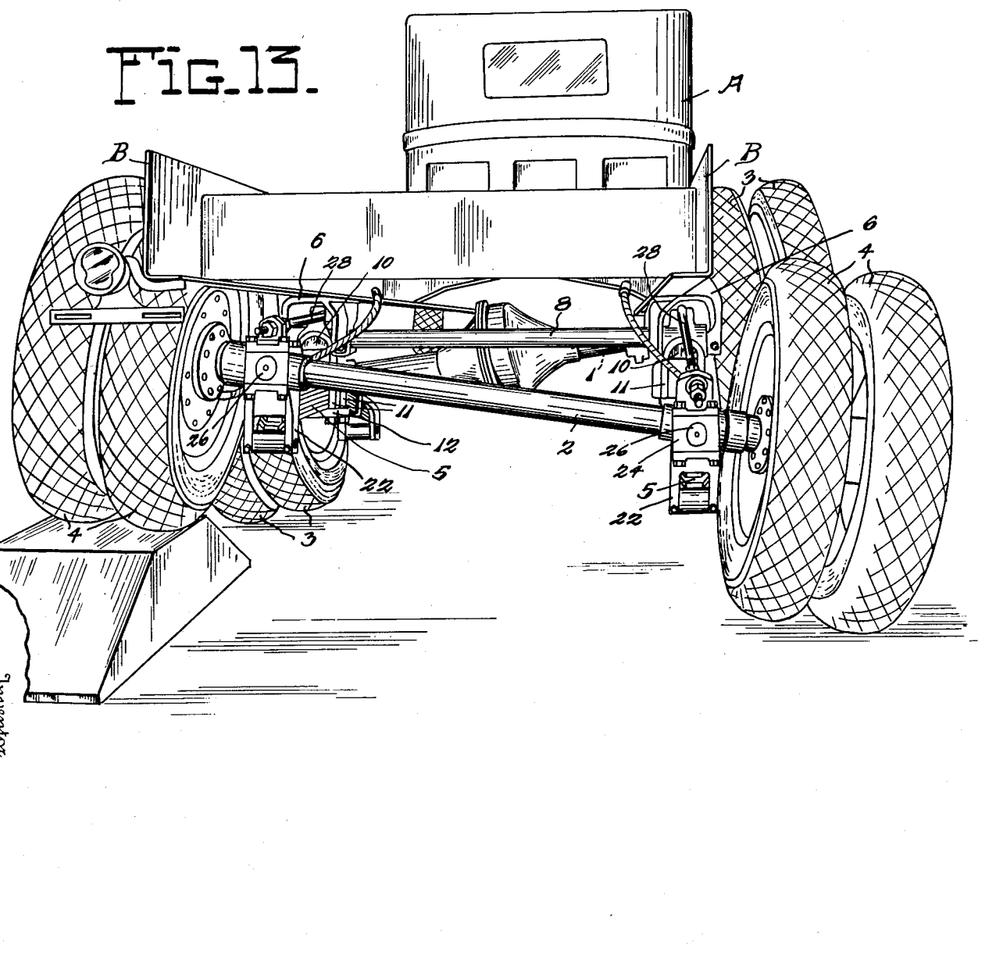

Specifically describing the invention and first referring to Figure 13 of the drawings, it is notable that the vehicle depicted comprises the cab A, which is carried by the usual chassis or main frame at the front end of which are the steering wheels, not illustrated. While the invention hereof may be used in conjunction with the regular or original main frame or chassis of the truck, as shown in Figure 2, the third axle unit is actually mounted upon an extension frame B which is suitably attached to the main chassis or frame C, illustrated in dotted lines, in Figure 2. The body of the truck will, of course, be mounted upon the parts C and B in any of the well known ways, but as this feature of the construction does not form any particular part of the present invention, it is not illustrated, and will not be further described. In other words, for the purposes of the present showing, it will be understood that the ordinary truck to which the invention is applied, is equipped with its extension frame B at the rear portion of the main chassis C and this extension frame B is intended to support the vehicle through the medium of the rear driving axle 1 and the idling axle 2, the former having the wheels 3 at its opposite ends and the latter having the wheels 4 at its opposite ends.

As is customary, springs are availed of for mounting the wheels 3 and 4 upon the frame B, these springs being designated 5, and being of extra heavy construction because the intention in using the unit hereof is to obtain not only increased carrying capacity for the original truck, the parts of which are rearranged for this purpose, but additional loading space is desired.

The extra heavy springs 5 are mounted on the frame B through the provision of brackets 6 secured by suitable fastenings 7 to the frame B, said brackets being designed with transverse bearings receiving a steel trunnion shaft 8 extending across the frame B transversely thereof and located about medially between the front driving axle 1 and the rear idling axle 2. The connection between the springs 5 and the brackets 6 is established by the provision of a pivot bearing member 9 disposed between the inboard and outboard bearings 6a of each bracket 6, said bearing member 9 having longitudinal extensions 10 over and around which the clamping U-bolts 11, for attachment of the springs 5, extend. The two springs 5 are, therefore, pivotally hung by means of the bearing members 9, and the U-bolts 11 with their clamp plates 12, from the trunnion shaft 8, all as seen best in Figure 1, the said springs 5 thus being adapted to swing about the transverse horizontal axis afforded by the trunnion shaft 8 in order to permit relative up and down movement of the axles 1 and 2 either bodily relatively to each other, or up and down movement of the ends of these respective axles, relatively to each other, as well shown in Figure 13.

Dealing now with the driving axle 1, it is notable that radius rods 13 are adjustably mounted at their front ends in pivot brackets 14 pivoted at the front extremities thereof, as shown at 15, to the sides of the frame B. The front extremities of the rods 13 are screw threaded and pass through spaced bearing members 16 of the pivot brackets 14, nuts 17 being applied to said screw threaded portions at points between the bearing members 16.

The rear ends of the radius rods 13 are pivoted as shown at 18 to the top portions of the cap members 19 of the front hangers 20, which front hangers receive the driving axle 1 so that the latter may turn within the hangers. The hangers 20 are practically two-part hangers, comprising the body portions having the cap members or sections 19 previously referred to. Said hangers 20 support the front ends of the under slung springs 5 by means of hanger links 21, depending pivotally from the lower portions of the hangers 20, as readily seen upon reference to Figures 1 and 2 of the drawings. The provision of the radius rods 13 is important, and these rods are susceptible of accuracy or nicety of adjustment in order to make sure that, by their provision, the driving axle 1 when relocated or remounted on the frame B, will move in the same identical arc or path of movement, vertically speaking, in which it originally moved when it was carried by the original truck chassis or frame. In other words, the driving axle 1 employed in carrying out the invention will, of course, be the original driving axle of the truck on which the third axle equipment hereof is used, said driving axle being merely moved rearwardly according to the arrangement and use of the extension frame B of this invention. It is on account of the brake equipment applied to the wheels of the driving axle 1 that the nicety of mounting of this driving axle, when relocated on the frame B, is required.

The brake equipment today involves brake equalization action and the parts are so arranged and operated, once adjusted, as to work properly according to the exact movement of the driving axle relatively to the frame of the vehicle on which it is mounted. Therefore, the necessity of compelling this same identical movement of the driving axle when it is replaced in a new position as compared with its original mounting on the original truck chassis; otherwise, the brake parts would not work easily and this has been one of the great difficulties heretofore in the adoption and use of so called third axle units.

Figures 1, 6, 7:
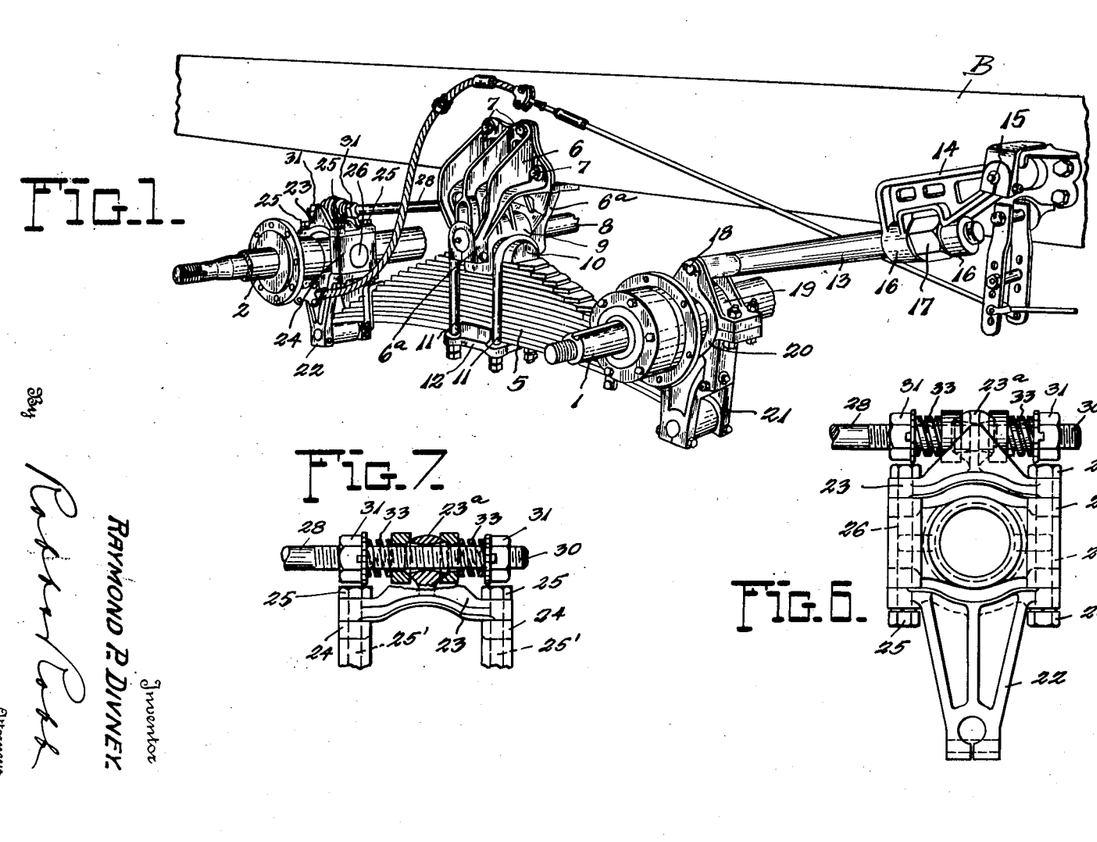
Figure 1 is a perspective view showing one of the main spring mountings at one side of the frame or chassis of the vehicle and illustrating the hanger arrangements intermediate the driving and adling axles, the draglink and radius rod arrangements and the trunnion shaft brackets intermediate the main springs and the side frame members, one spring unit at a single side of the vehicle only being illustrated.
Figure 6 is a detail view showing more fully the draglink connection with the rear or third axle including the ball joint and compression spring features for absorption of shocks.
Figure 7 is a fragmentary sectional view showing more fully certain of the parts of Figure 6.
Figure 1:
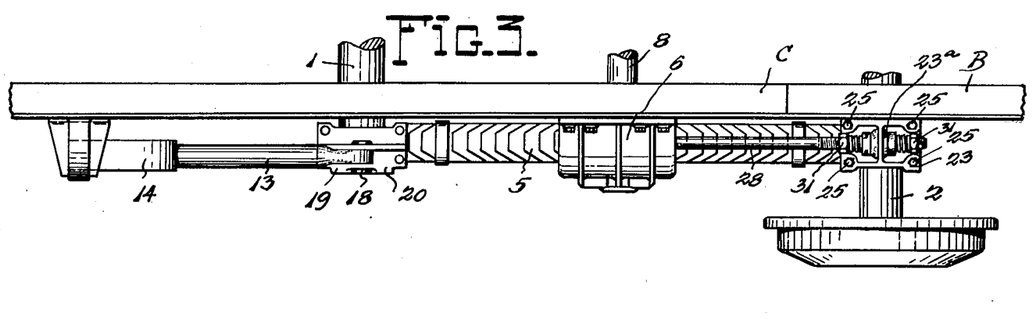
Figures 4, 5, 8, 9:
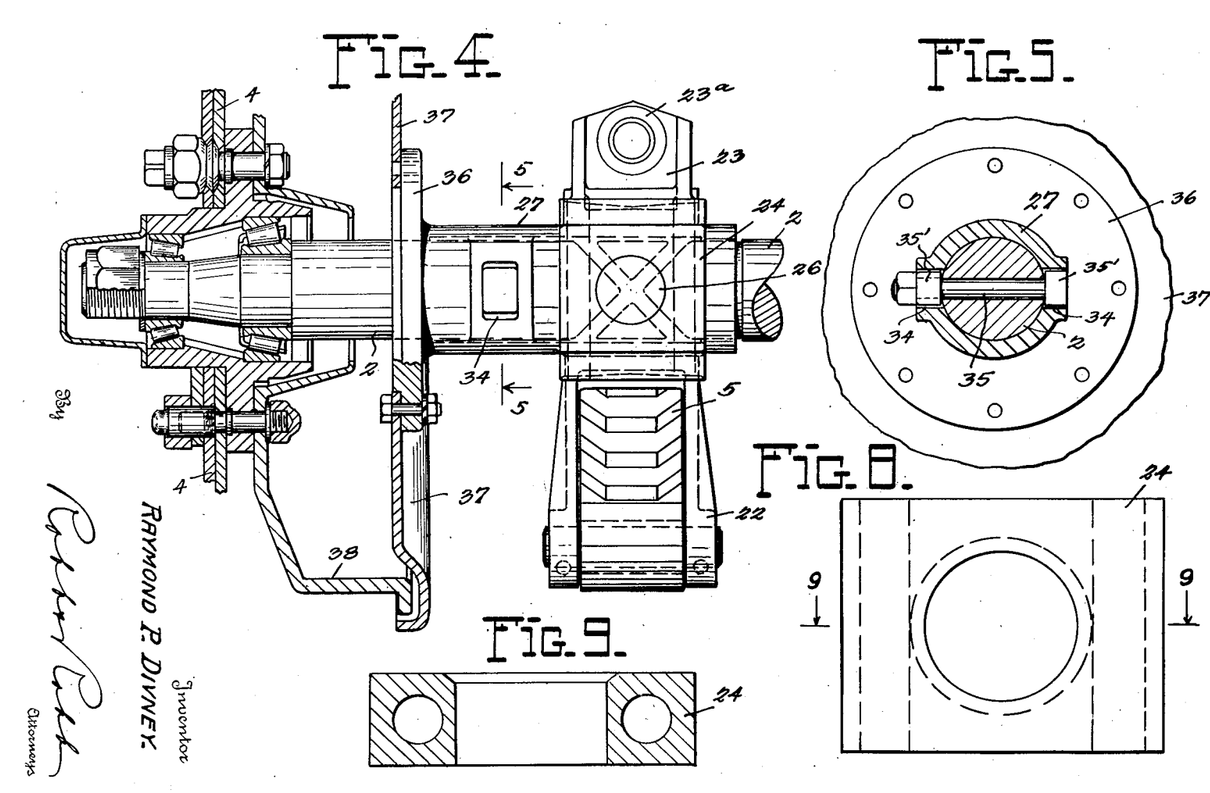
Figure 4 is a view partly in elevation and partly in section of an end portion of the idling axle with the spring hanger mounted thereon, a portion of the associated driving wheel and brake drum and the closing plate for the brake drum, said plate carrying usually the brake band actuating parts, not illustrated.
Figure 5 is a fragmentary view partly in section and partly in elevation, taken about on the line 5—5 of Figure 4 showing the interlocking means between the rear idling shaft and the trunnion sleeve and closing plate aforesaid.
Figures 8 and 9 are side and sectional views of trunnion bearing blocks forming a part of the assembly of the third axle spring hanger, the sectional view of Figure 9 being taken about on the line 9—9 of Figure 8.
Figure 10:
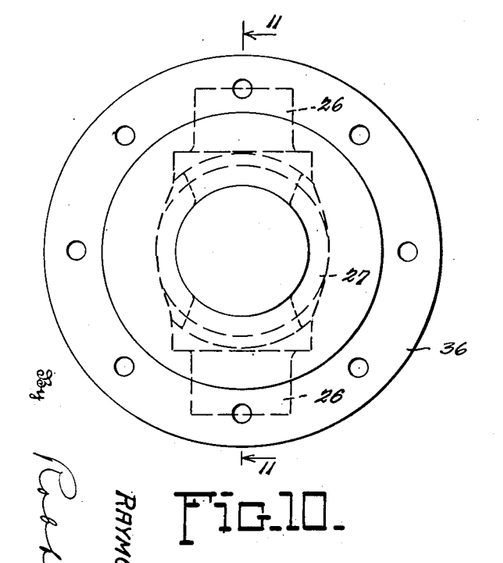
Figure 10 is a view of one of the trunnion sleeves in which the rear idling shaft is mounted, the view looking toward the end of the view of Figure 11.
Figure 11:
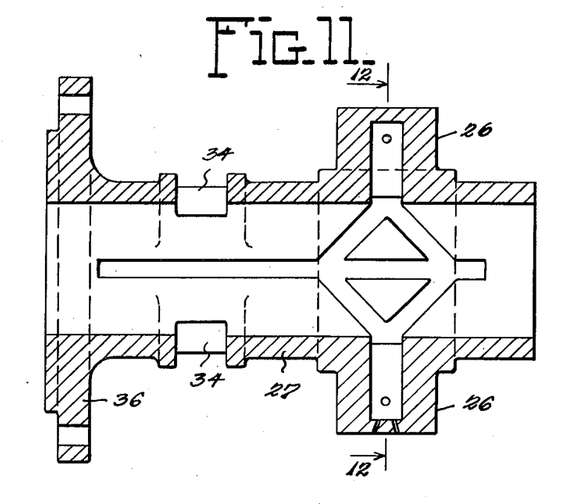
Figure 11 is a longitudinal sectional view of the said trunnion sleeve shown in Figure 10.
Figure 12:
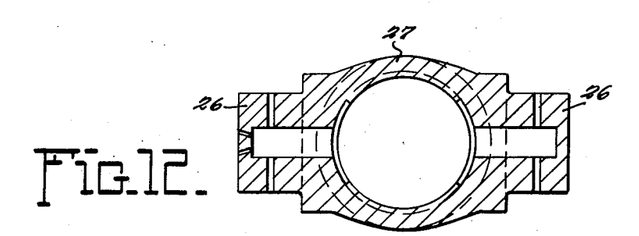

Referring now to the rear ends of the springs 5, it is notable that these springs are connected with the third axle or idling axle 2 by means of special hangers seen best in Figures 4, 6 and 7. These rear spring hangers are designated 22 and comprise lower sections provided with cap sections 23 and trunnion bearing members 24, seen best in Figures 8 and 9. Suitable bolts 25 fasten the parts 23, 24 and 22 together in an obvious manner, as seen in Figure 6, the two bearing members 24 of each hanger 22 being spaced apart and their bearings receiving the trunnions 26, see Figure 12, of the axle bearing members of sleeves 27 provided for the rear or idling axle 2. In other words, the rear or idling axle 2 is directly supported in the bearing members of sleeves 27 of the hangers 22, so that the hangers 22 may rotate slightly around the axle 2.

Additionally, the hangers 22 are adapted for transverse pivotal movement with the trunnions 26 as the axes thereof, all for the purpose of allowing for a substantially universal connection between the rear axles and the hanger means 22 affording the variation in movement, one example of which is illustrated in Figure 13 of the drawings. The mounting means just described is very efficient in that it permits the hangers 22 and their associated springs 5 to remain substantially vertical and thus support the chassis or frame of the truck in a substantially horizontal position notwithstanding variations in the movement of the axle 2 from a true parallel position in relation to the ground. Thus, in effect, the rearmost wheels 4 are free to move up and down together, or independently, and to a greater or less extent at both sides of the vehicle whilst the springs 5 yield to permit such action, and whilst the main frame of the vehicle remains substantially vertical, all with a view to obtaining a reduction in the shocks and stresses transmitted to the chassis of the vehicle, as will be readily obvious to those versed in the art. Much the same action is obtained in the driving axle I as has been described in reference to the axle 2 because the hangers 20 are adapted to rotate partially around the axle I and as the opposite ends of the axle I rise and fall assuming positions at an angle to the horizontal and/or at an angle to the ground level the hangers 20 will pivot and assume angular positions relatively to the vertical, this being permitted because the hanger links 21 have pivotal connection with the hangers 20 and the links 21 may remain substantially vertical, notwithstanding the transverse angularity imparted to the members 21 moving with the axle I.
It is notable in further reference to the manner of connecting the idle axle 2 to the springs 5 that the cap members 23 of the hangers 22 are connected by radius rods or torque rods 28 to the brackets 6, the front ends of the radius rods 28 being pivotally attached to said brackets at the points 29. The cap members 23 of the hangers 22 are each equipped with an upwardly projecting ball joint member 23a loosely receiving the rear end of the adjacent radius rod and freely slidable along said radius rod for this reason.

Each draglink 28 has its rear end threaded as shown at 30, see Figure 7, and the threaded portion passes through the ball joint member 23a of the cooperating cap member 23. Nuts 31 are screwed upon the threaded portion 30 of each link 28 and between these nuts and their cooperating washers and bearing washers 32 on each rod 28 are interposed the coiled springs 33. It will, therefore, be apparent that each ball joint member 23a is resiliently held in position on the adjacent draglink or torque rod 28, and this construction is designed for the purpose of absorption of shocks incident to braking and driving forces applied to the brake drums of the wheels of the rear or idling axle 2. As seen in Figure 4, the bearing members of sleeves 27 of the hangers 22 receive the idle or third axle 2 and the parts 27 are formed with slots 34 in which slots are mounted guide blocks 35' mounted upon the axle 2 by means of guide pins 35, the guide blocks being of less dimension than the slots 34 so as to permit of a certain amount of relative movement between the axle 2 and the sleeve 27. The sleeve 27 carries a flanged portion 36 on which the brake drum closing plate 37 is secured in the well known manner. This plate 37 carries brake actuating parts for the brake band that engages the brake drum 38 illustrated in Figure 4 as carried by one of the wheels 4, a plurality of which will be supported on the third or idling axle 2. It is obvious that in the practical use of the invention when the brake means carried by the part 37 is applied to the brake drum 38 according to the illustration of Figure 1, the tendency will be for the brake drums 38 to move the bearing member or sleeve 27 in wheel turning direction relatively to the axle 2 and this movement to a slight extent is permitted under the controlling cushioning or shock absorbing effect of the connection established by the adjacent draglink 28. It is in this manner that the draglinks with their compression springs 33 are capable of affording shock absorbing means respecting the braking operations of the devices as set forth above.

The ends of the springs 5 are suitably anchored in connection with the respective parts 22 and 21, a pair of which will be disposed at the opposite ends of the springs on each side of the frame B of the vehicle. It is to be understood, or course, that the present invention is not limited to the use of the springs, mounting parts and connecting parts, as above described, as applied to the extension frame B of a truck because the said parts may be disposed practically wholly upon the original frame or chassis of the truck where increased load space is not required but increased carrying capacity is desired.

Again, the said parts may be disposed so that the drive axle I is either at its original location upon the original chassis or moved slightly rearwardly thereon, and the idling axle 2 disposed alone upon the frame B. Various arrangements of these parts are contemplated within the purview of the invention, hence the foregoing explanation.

For all practical purposes, the front and rear ends of the springs 5 are connected with the respective axles I and 2 by universal joint connections. The parts 20 and 21 afford such connection in one instance, and the parts 22, 23, 24, 26 and 27 afford such a connection in the second instance. In Figure 1 is illustrated brake actuating means connected to the rearmost brake device illustrated, but as this feature of the construction is not any part of the present invention, no particular reference is made thereto.

It will be understood that usually the driving axle 1 employed for the invention will be the original driving axle of the original truck whilst the idling axle 2 will be the added or auxiliary third axle member enabling the conversion of the truck from a four wheel to a six wheel unit.

Having thus described my invention, what I claim as new and desire to secure by Letters Patent of the United States, is:—

1. In a third axle unit construction for automotive trucks, in combination, a truck frame, springs at opposite sides of the said frame, transverse trunnion means between the springs and the frame affording pivotal mountings for the springs enabling the same to rock upwardly and downwardly at their ends while disposed longitudinally of the frame, axles at the front and rear ends of said springs, connections between said axles and springs comprising spring hangers affording universal connections between the axle and springs, adjustable radius rods connected with the spring hangers at the front ends of the springs and attached to the frame and resilient connections intermediate the frame and the spring hangers at the rear ends of the springs.

2. In a third axle unit construction for automotive trucks, in combination, a truck frame, springs at opposite sides of the said frame, transverse trunnion means between the springs and the frame affording pivotal mountings for the springs enabling the same to rock upwardly and downwardly at their ends while disposed longitudinally of the frame, axles at the front and rear ends of said springs, connections between said axles and springs comprising spring hangers affording universal connections between the axle and springs, adjustable radius rods connected with the spring hangers at the front ends of the springs and attached to the frame, and resilient connections intermediate the frame and the spring hangers at the rear ends of the springs, the adjustable radius rods comprising rod sections and brackets adjustably attached thereto and pivotally connected with the frame.

3. In a third axle unit construction for automotive trucks, in combination, a truck frame, springs at opposite sides of the said frame, transverse trunnion means between the springs and the frame affording pivotal mountings for the springs enabling the same to rock upwardly and downwardly at their ends while disposed longitudinally of the frame, axles at the front and rear ends of said springs, connections between said axles and springs comprising spring hangers affording universal connections between the axle and springs, adjustable radius rods connected with the spring hangers at the front ends of the springs and attached to the frame and resilient connections intermediate the frame and the spring hangers at the rear ends of the springs, brackets applied to the frame and supporting the transverse trunnion means for supplying the rocking mounting of the springs, the said resilient connections comprising radius rods having yieldable attachment to the said spring hangers at the rear ends of the springs and said latter radius rods being directly pivoted at corresponding ends with the brackets attached to the frame to thus establish a connection between the frame and the resilient connections as above set forth.

4. In a third axle unit construction for automotive trucks, in combination, a truck frame, a pair of springs attached thereto, an axle adjacent corresponding ends of said springs, spring hangers intermediate the axle and springs and attached at one end to the adjacent ends of the springs and rotatively mounted relatively to the axle upon the latter, brake means movably associated with the axle, and shock absorbing means for said brake means including resilient connections between the other ends of said spring hangers and the frame.

5. In a third axle unit construction for automotive trucks, in combination, a truck frame, a pair of springs attached thereto, an axle adjacent corresponding ends of said springs, spring hangers intermediate the axle and springs and attached at one end to the adjacent ends of the springs and rotatively mounted relatively to the axle upon the latter, brake means movably associated with the axle, and shock absorbing means for said brake means including resilient connections between the other ends of said spring hangers and the frame, said resilient connections including radius rods having pivotal connection to the frame, ball joint members carried by said spring hangers and receiving said links, and springs mounted on the radius rods for yielding engagement with said ball joint members.

6. In a third axle unit construction for automotive trucks, in combination, a truck frame, a pair of springs attached thereto, an axle adjacent corresponding ends of said springs, spring hangers intermediate the axle and springs and attached at one end to the adjacent ends of the springs and rotatively mounted relatively to the axle upon the latter, brake means associated with the axle, and shock absorbing means for said brake means including resilient connections between the other ends of said spring hangers and the frame, said resilient connections including radius rods having pivotal connection to the frame, ball joint members carried by said spring hangers and receiving said links, and springs mounted on the radius rods for yielding engagement with said ball joint members, and bearing members including sleeves receiving the axle and having trunnions upon which the spring hangers are adapted to rock about an axis at right angles to the axis of the said axle, the said sleeves being equipped with parts for supporting brake members.

7. In a third axle unit construction for automotive trucks, in combination, a frame, springs carried by opposite sides of said frame, transverse rocker bearing means intermediate the springs and the sides of the frame by which they are carried permitting the springs to rock in a vertical plane longitudinal of the frame, axles at the front and rear ends of said springs, spring hanger devices anchored to opposite ends of said springs and receiving said axles, said spring hanger devices comprising bearings permitting rotation of the hanger devices about the axles in a direction longitudinally of the frame, and said spring hangers comprising parts permitting transverse movement of the axes relatively to the spring hangers about axes longitudinally of the frame, substantially as set forth.

8. In a third axle unit construction for automotive trucks, in combination, a frame, springs carried by opposite sides of said frame, transverse rocker bearing means intermediate the springs and the sides of the frame by which they are carried permitting the springs to rock in a vertical plane longitudinal of the frame, axles at the front and rear ends of said springs, spring hanger devices anchored to opposite ends of said springs and receiving said axles, said spring hanger devices comprising bearings permitting rotation of the hanger devices about the axles in a direction longitudinally of the frame and said spring hangers comprising parts permitting transverse movement of the spring hangers relatively to the axles about axes longitudinally of the frame, radius rods connected with the spring hanger devices at the front ends of the springs and attached to the frame, and radius rods connecting the frame with the rear hanger devices at the rear end of the springs including parts carried by the radius rods resiliently engaging the last mentioned hanger devices, said last mentioned hanger devices comprising parts carrying brake devices for cooperation with said resilient parts substantially as set forth.

9. In a third axle unit construction for automotive trucks, a truck frame, springs at opposite sides of said frame, transverse rocker bearings between the springs and the frame affording pivotal mountings for the springs enabling the same to rock upwardly and downwardly at their ends while disposed longitudinally of the frame, axles at the front and rear ends of said springs, connections between said axles and springs comprising sleeves rotatively mounted on the axles, said sleeves being provided with trunnion means, spring hangers rotatively mounted upon said trunnion means for transverse movement with respect to the truck frame, said connections affording universal movement of the axles relative to the frame, adjustable radius rods connected with the spring hangers at the front ends of the springs and attached to the frame and resilient connections intermediate the frame and the spring hangers at the rear ends of the springs.

RAYMOND P. DIVNEY.

CERTIFICATE OF CORRECTION.

Patent No. 2,002,852.            May 28, 1935.

RAYMOND P. DIVNEY.

It is hereby certified that error appears in the printed specification of the above numbered patent requiring correction as follows: Page 4, second column, line 71, claim 7, for "axes" read axles; and that the said Letters Patent should be read with this correction therein that the same may conform to the record of the case in the Patent Office.

Signed and sealed this 25th day of June, A. D. 1935.

Bryan M. Battey (Seal)                                Acting Commissioner of Patents.